United States Patent
Ahn et al.

(10) Patent No.: US 9,919,948 B2
(45) Date of Patent: Mar. 20, 2018

(54) FUSED QUARTZ TUBING FOR PHARMACEUTICAL PACKAGING

(71) Applicant: Momentive Performance Materials Inc., Waterford, NY (US)

(72) Inventors: Kipyung Ahn, Solon, OH (US); Guangjun Xu, San Jose, CA (US); Martin Panchula, Eastlake, OH (US); Samuel Conzone, Castleton, NY (US); Tianjun Rong, Shanghai (CN); Konstantin S. Zuyev, Plymouth, MN (US); Yen Zhou, Gates Mills, OH (US)

(73) Assignee: MOMENTIVE PERFORMANCE MATERIALS, INC., Waterford, NY (US)

( * ) Notice: Subject to any disclaimer, the term of this patent is extended or adjusted under 35 U.S.C. 154(b) by 0 days.

(21) Appl. No.: 15/176,259

(22) Filed: Jun. 8, 2016

(65) Prior Publication Data

US 2016/0355429 A1    Dec. 8, 2016

Related U.S. Application Data

(63) Continuation of application No. 13/477,396, filed on May 22, 2012, now Pat. No. 9,399,000, which is a
(Continued)

(51) Int. Cl.
*C03C 3/06* (2006.01)
*A61J 1/00* (2006.01)
(Continued)

(52) U.S. Cl.
CPC ............ *C03C 3/06* (2013.01); *A61J 1/00* (2013.01); *A61J 1/1468* (2015.05); *B65D 1/00* (2013.01);
(Continued)

(58) Field of Classification Search
CPC ............ C03C 2201/06; C03C 2201/30; C03C 2201/32; C03C 2201/34; C03C 2201/40; C03C 2201/42; C03C 3/06
See application file for complete search history.

(56) References Cited

U.S. PATENT DOCUMENTS 2,221,709 A    11/1940   Hood et al.
2,895,839 A     7/1959   George
(Continued)

FOREIGN PATENT DOCUMENTS

WO     2004089836       10/2004
WO   WO/2004/089836  * 10/2004  ............... C03C 3/06
(Continued)

OTHER PUBLICATIONS

International Search Report and The Written Opinion of the International Searching Authority, Rong, Tianjun, dated Aug. 20, 2010.
(Continued)

*Primary Examiner* — Noah S Wiese
(74) *Attorney, Agent, or Firm* — Joseph Waters; McDonald Hopkins LLC

(57) ABSTRACT

A high silica glass composition comprising about 92 to about 99.9999 wt. % $SiO_2$ and from about 0.0001 to about 8 wt. % of at least one dopant selected from $Al_2O_3$, $CeO_2$, $TiO_2$, $La_2O_3$, $Y_2O_3$, $Nd_2O_3$, other rare earth oxides, and mixtures of two or more thereof. The glass composition has a working point temperature ranging from 600 to 2,000° C. These compositions exhibit stability similar to pure fused quartz, but have a moderate working temperature to enable cost effective fabrication of pharmaceutical packages. The glass is particularly useful as a packaging material for pharmaceutical applications, such as, for example pre-filled syringes, ampoules and vials.

24 Claims, 4 Drawing Sheets

Related U.S. Application Data continuation-in-part of application No. 13/391,527, filed as application No. PCT/US2010/046189 on Aug. 20, 2010, now abandoned, said application No. 13/477,396 is a continuation-in-part of application No. 11/557,805, filed on Nov. 8, 2006, now abandoned.

(60) Provisional application No. 61/235,823, filed on Aug. 21, 2009, provisional application No. 60/805,300, filed on Jun. 20, 2006.

(51) Int. Cl.
| | |
|---|---|
| B65D 1/00 | (2006.01) |
| C03C 4/00 | (2006.01) |
| C03B 1/00 | (2006.01) |
| A61J 1/14 | (2006.01) |
| C03C 4/08 | (2006.01) |
| C03C 4/20 | (2006.01) |
| C03B 17/04 | (2006.01) |

(52) U.S. Cl.
CPC .............. *C03B 1/00* (2013.01); *C03C 4/00* (2013.01); *C03C 4/085* (2013.01); *C03C 4/20* (2013.01); *C03B 17/04* (2013.01); *C03C 2201/11* (2013.01); *C03C 2201/23* (2013.01); *C03C 2201/32* (2013.01); *C03C 2201/3423* (2013.01); *C03C 2201/42* (2013.01); *C03C 2203/10* (2013.01); *C03C 2204/00* (2013.01); *Y10T 428/131* (2015.01)

(56) References Cited

U.S. PATENT DOCUMENTS

| | | | |
|---|---|---|---|
| 3,148,300 A | 9/1964 | Graff | |
| 3,527,711 A | 9/1970 | Barber et al. | |
| 3,848,152 A | 11/1974 | Schultz | |
| 4,307,315 A | 12/1981 | Meulemans et al. | |
| 4,361,779 A | 11/1982 | van der Steen et al. | |
| 4,605,632 A | 8/1986 | Elmer | |
| 4,904,293 A | 2/1990 | Garnier et al. | |
| 5,196,759 A | 3/1993 | Parham et al. | |
| 5,248,637 A * | 9/1993 | Taneda ................. C03B 37/011 501/35 |
| 5,250,096 A | 10/1993 | Bruce et al. | |
| 5,330,941 A | 7/1994 | Yaba et al. | |
| 5,561,385 A | 10/1996 | Choi | |
| 5,569,629 A | 10/1996 | TenEyck et al. | |
| 5,569,979 A * | 10/1996 | Scott .......................... C03C 3/06 313/493 |
| 5,572,091 A | 11/1996 | Langer et al. | |
| 5,585,173 A | 12/1996 | Kamo et al. | |
| 5,680,010 A | 10/1997 | Weiss et al. | |
| 5,763,343 A | 6/1998 | Brix et al. | |
| 5,770,535 A | 6/1998 | Brix et al. | |
| 5,782,815 A | 7/1998 | Yanai et al. | |
| 5,851,253 A | 12/1998 | Pet et al. | |
| 6,027,481 A | 2/2000 | Barrelle et al. | |
| 6,136,736 A * | 10/2000 | Rajaram .................. C03C 3/06 313/571 |
| 6,200,658 B1 | 3/2001 | Walther et al. | |
| 6,423,656 B1 | 7/2002 | Coriand et al. | |
| 6,537,626 B1 | 3/2003 | Spallek et al. | |
| 6,576,380 B2 | 6/2003 | Davis, Jr. et al. | |
| 6,677,260 B2 | 1/2004 | Crane et al. | |
| 6,689,706 B2 | 2/2004 | Sempolinski | |
| 6,887,576 B2 | 5/2005 | Sato et al. | |
| 6,946,416 B2 | 9/2005 | Maxon et al. | |
| 7,365,037 B2 | 4/2008 | Sato et al. | |
| 7,429,546 B2 * | 9/2008 | Iwahashi ............. C03B 19/1415 250/504 R |
| 7,514,382 B2 | 4/2009 | Ikuta et al. | |
| 7,585,598 B2 | 9/2009 | Maida et al. | |
| 7,661,277 B2 | 2/2010 | Sato et al. | |
| RE41,249 E | 4/2010 | Sato et al. | |
| 2001/0044370 A1 | 11/2001 | Crane et al. | |
| 2002/0077243 A1 | 6/2002 | Sircar | |
| 2003/0040423 A1 * | 2/2003 | Harada .................... C03B 19/01 501/54 |
| 2004/0063564 A1 | 1/2004 | Kawai et al. | |
| 2006/0279220 A1 * | 12/2006 | Flink ........................ C03C 3/06 315/58 |
| 2007/0015652 A1 | 1/2007 | Mangold et al. | |
| 2007/0293388 A1 | 12/2007 | Zuyev et al. | |
| 2010/0003609 A1 | 1/2010 | Maida et al. | |
| 2012/0148770 A1 | 6/2012 | Rong et al. | |

FOREIGN PATENT DOCUMENTS

| | | | | |
|---|---|---|---|---|
| WO | WO/2005/024893 | * | 3/2005 | ............. C03C 3/06 |
| WO | 2011022664 | | 2/2011 | |

OTHER PUBLICATIONS

Patent Abstracts of Japan, Production of Black Glass, Tosoh Corp., Application No. 03-356869, Dec. 26, 1991.
Patent Abstracts of Japan, Production of Quartz Glass, Tosoh Corp., Application No. 03-073611, Mar. 14, 1991, pp. 211-219.
Sanga, S.V., Review of Glass Types Available for Packaging Parenteral Solutions, Mar.-Apr. 1979, vol. 33, No. 2 pp. 61-67.

* cited by examiner

·········· quartz, 177 ppm OH
———— quartz, 124.5 ppm OH
- - - - quartz, 5 ppm OH

FUSED QUARTZ TUBING FOR PHARMACEUTICAL PACKAGING

CROSS-REFERENCE TO RELATED APPLICATION

This application is a Continuation of U.S. application Ser. No. 13/477,396, filed May 22, 2012, which is a Continuation-in Part of U.S. application Ser. No. 11/557,805, filed Nov. 8, 2006, which claims the benefit of U.S. Provisional Application 60/805,300 filed Jun. 20, 2006, each of which is incorporated by reference in its entirety. This Application also claims the benefit of U.S. application Ser. No. 13/391,527, filed Feb. 24, 2012, and to PCT Application PCT/US2010/046189, filed Aug. 20, 2010, which claims priority to and the benefit of U.S. Provisional Patent Application No. 61/235,823, entitled "Fused Quartz Tubing for Pharmaceutical Packaging," filed on Aug. 21, 2009, each of which is incorporated herein in its entirety by reference.

BACKGROUND OF THE INVENTION

In glass applications such as liquid crystal panels, optical communication devices for instance optical filters and optical switches, recording medium, halogen and High Intensity Discharge (HID) lamps etc. the consistency of the glass substrate properties is quite critical. High-energy laser systems employ multiple large pieces of optical quality glass, sometimes thousands of large size laser glass pieces, and it is imperative for the pieces to have consistent optical quality. Glass compositions, similarly to fused quartz compositions, are characterized by a few fundamental properties affecting the manufacturing of or the properties of products employing the compositions, i.e., viscosity, % transmission, OH level to name a few. The effect of OH (hydroxyl) on viscosity of glass or quartz is widely known. FIG. 1, for instance, illustrates the viscosity curves of high purity quartz made with various OH concentrations. As seen from the Figure, viscosity of glass drastically drops with increased hydroxyl concentration. If glass or quartz has batch-to-batch or within-batch variations in the OH level, it will result in inconsistent manufacturability and product quality. From a lamp manufacturer's perspective, variations in the glass properties impact the yields of the high-speed lamp production lines, requiring undesirable and frequent adjustments made to the equipment to account for the variations in the glass properties.

Almost all arc discharge lamps and many high intensity filament lamps, such as tungsten-halogen lamps, emit ultraviolet (UV) radiation which may be harmful to human eyes and skin. As disclosed in U.S. Pat. Nos. 2,895,839; 3,148,300; 3,848,152; 4,307,315 and 4,361,779, lamps have been developed having a light source which emits both UV and visible light radiation enclosed within a vitreous envelope of fused quartz. U.S. Pat. Nos. 2,221,709; 5,569,979; 6,677,260 disclose fused quartz compositions containing UV-absorbing materials, or dopants as they are called, in the form of tubings or rods for use in making lamps, e.g., as lamp envelopes with properties to absorb UV radiation.

U.S. Patent Publication No. 20040063564A1 discloses a composition useful for forming glass substrates for use in information recording medium, with desirable properties such as specific linear thermal expansion coefficient, fracture toughness, and a predetermined surface hardness. In applications for making bulk glass articles such as fiberglass, it is also useful to have consistency in the glass compositions to obtain the desired ranges of properties such as viscosities, humidity resistance, and the like. U.S. Patent Publication No. 20020077243A1 discloses a composition for making glass fiber filters for use in micro-electronic clean room environments.

Due to the bulk volume of the feedstock making up the glass composition, there is a wide batch-to-batch variation in glass compositions as well as in the properties of products made from glass compositions of the prior art. It is important to have consistent properties in a glass composition such that products made thereof have properties that are uniform or varying in a narrow range. Additionally, the consistent properties allowing manufacturers to run production lines with minor or no adjustments in the line, for high productivity and consistently good glass products. In one aspect, the invention provides a novel glass composition and a method for making glass products with uniform properties, as measured by the standard deviation.

Glasses also find application in pharmaceutical packaging. There has been a recent trend in the pharmaceutical market toward the increased use of biological (protein-based) drugs that are more "sensitive" than traditional drugs. With these types of drugs, the topic of drug/container interaction becomes increasingly important due to the lower stability of these drugs and their propensity to degrade during storage, especially when formulated as a liquid. Because of this, extractable substances (e.g. dissolved cations) coming from the pharmaceutical packaging container can cause issues with regard to efficacy and purity with these drugs (including drug instability, toxicity, etc). *A Review of Glass Types Available for Packaging*, S. V. Sangra, Journal of the Parenteral Drug Association, March-pr., 1979, Vol. 33, No. 2, pp. 61-67.

Cationic extraction from traditional glasses used in pharmaceutical packaging can create issues with the purity and/or effectiveness of such protein-based drugs. The mechanism of cationic extraction is typically hydronium/alkali ion exchange that causes a pH increase, which is then followed by bulk dissolution, especially in Type I (e.g., borosilicate, such as Schott Fiolax®) and Type II (soda lime silicate) glasses. The poor chemical durability of these glasses arises from the fact that soluble cations, such as $Na^+$, $Li^+$, $K^+$, $Mg^{2+}$, $Ca^{2+}$ and/or $Ba^{2+}$ are used to flux these glasses to achieve a suitably low working point temperature that makes them highly processable with standard glass melting equipment (see, e.g., U.S. Pat. Nos. 5,782,815 and 6,027,481).

Glass particle generation due to delamination is one of the major concerns in pharmaceutical packaging industries when Type I and Type II glasses are used as the container for pharmaceutical products. Delamination occurs when top layers of a glass separate at a scale that is barely visible or invisible to the naked eyes as shown in FIG. 1 of Ronald G Iacocca, "The Cause and Implications of Glass Delamination", Pharmaceutical Technology, 2011, pp s6-s9, the disclosure of which is incorporated herein by reference in its entirety. The particles become suspended in drug solutions, posing a serious risk to the consumer.

Glasses without chemical modifiers (e.g., alkali metals, borates, alkaline earth metals) such as fused quartz glass are preferable from a chemical purity (low extractables) and chemical durability perspective, but such glasses may be difficult to manufacture due to the high processing temperatures required (typically >2,000° C.). Even when fused quartz glasses can be melted and formed into tubing, it is then often difficult to flame convert them into pharmaceutical packages (vials, syringe barrels, ampoules, etc), due to a high working point temperature (>1,700° C.). Thus, such glasses have generally not been used to manufacture pharmaceutical packaging. U.S. Pat. Nos. 6,200,658 and 6,537,626 show that efforts have been made to coat the interior surfaces of traditional glass containers with a layer of silica to reduce extractables (e.g., Schott Type I Plus®) and glass particles that are produced through delamination. Providing coated articles, however, are cumbersome and expensive and, therefore, not widely accepted in the pharmaceutical packaging market. Thus, there is a need for a cost-effective pharmaceutical packaging glass that exhibits low extractables and leaching with a moderate working point temperature that can be used in pharmaceutical packaging applications.

BRIEF DESCRIPTION

Drugs are packaged in various glass pharmaceutical containers, including single-use pre-filled syringes, cartridges, ampoules, vials and the like. In one aspect, the present invention provides a pharmaceutical packaging comprising a low softening point high silicate (substantially modifier free) glass tubing that can be flame converted to form traditional pharmaceutical packages (e.g., syringe barrels, cartridges, ampoules, vials, etc). The tubing does not contain appreciable amounts of traditional glass modifiers (e.g., alkali metals, alkaline earth metals, and borate ions), and the resulting packaging is thus highly resistive to cationic extraction when placed in contact with an aqueous-based solution intended for drug formulation. In one embodiment, the inventions provide a pharmaceutical packaging that exhibits little or no glass particle generation through delamination. Applicants have found that the working point temperature and the viscosity of the glass (at a particular temperature) can be reduced through additions of non-traditional-modifiers to achieve a working point temperature that is acceptable for use in the fabrication of pharmaceutical packaging using thermal process (e.g., flame conversion).

In one aspect, the invention provides a glass composition comprising a lot of glass articles, the glass composition containing 40 to 99 wt. % $SiO_2$, wherein the glass composition has a softening temperature ranging from 500° C. to 1700° C., and wherein the standard deviation of softening temperature measurements obtained from 10 or more randomly selected samples of glass articles produced from the lot is 10° C. or less.

In another aspect, the invention provides a process for making a glass product comprising the steps of: (a) forming a first blend of 0.02 to 0.50 wt. % of a dispersant with 1 to 25 wt. % of a dopant selected from the metal oxide group of $Al_2O_3$, $TiO_2$, $CeO_2$, $Nd_2O_3$, TiO2, BaO, SrO, MgO, $Sb_2O_3$, $Y_2O_3$, $Co_3O_4$, $Cu_2O$, $Cr_2O_3$ and mixtures thereof, wherein the dispersant is a fumed metal oxide having a BET of 50-400 $m^2/g$ and a mean particle size of <1 μm; (b) blending the first blend into 92-99 wt. % $SiO_2$ forming a quartz mixture; (c) producing a melt of molten glass from the mixture; and (d) passing the molten glass along a tool to form a glass product. In one embodiment, the glass product is in the form of a tubing, a rod, or a blank. In a another embodiment, the fumed metal oxide is selected from at least one of silica or a metal oxide already present in the dopant.

The invention further relates to a glass product, comprising 92-99 wt. % of $SiO_2$, 1 to 8 wt. % of a dopant selected from the metal oxide group of $Al_2O_3$, $CeO_2$, $TiO_2$, $Nd_2O_3$, TiO2, $B_2O_3$, BaO, SrO, MgO, $Sb_2O_3$, $Y_2O_3$, $Co_4O_4$, $Cu_2O$, $Cr_2O$, and mixtures thereof; and 0.02 to 0.50 wt. % of a fumed metal oxide having a BET of 50-400 $m^2/g$ and a mean particle size of <1 μm, and wherein the fumed metal oxide is $SiO_2$ or a metal oxide present in the dopant, wherein the viscosity of a plurality of products prepared from the same batch exhibits a standard deviation of less than 10 degree Celsius.

In one aspect, a glass composition in accordance with the present invention utilizes non-traditional modifier dopants (oftentimes referred to as intermediates within the glass science community), such as $Al_2O_3$, $G_eO_2$, $Ga_2O_3$, $CeO_2$, $ZrO_2$, $TiO_2$, $Y_2O_3$, $La_2O_3$, $Nd_2O_3$, other rare earth oxides, and mixtures of two or more thereof, to achieve a high wt % content silica glass with lower working point temperature, and lower viscosity (at a particular temperature) as compared to pure fused quartz while retaining the chemical inertness with respect to drugs similar to pure fused quartz glass. It has been found that incorporating non-traditional modifiers into the fused quartz glass effectively reduces the working point temperature by up to several hundred Kelvin and, therefore, enables rapid flame conversion/processing of tubing into pharmaceutical containers, while also enabling the glass to retain the excellent chemical durability and a resistance to cation extraction/leaching characteristic of quartz glass.

The dopants listed above are selected based on the ability of these cations to reduce the working temperature of fused silica, while retaining a chemical durability that will be extremely resistant to cationic extraction when the resulting glass is placed into contact with an aqueous solution intended for drug formulation. This resulting, modified glass tubing can be fabricated into various pharmaceutical packages, including syringe barrels, cartridges, ampoules, and vials. At the same time, the chemical inertness of this glass renders it superior to borosilicate and soda lime silicate glasses that are traditionally used for pharmaceutical packaging.

DETAILED DESCRIPTION

Figure 1:
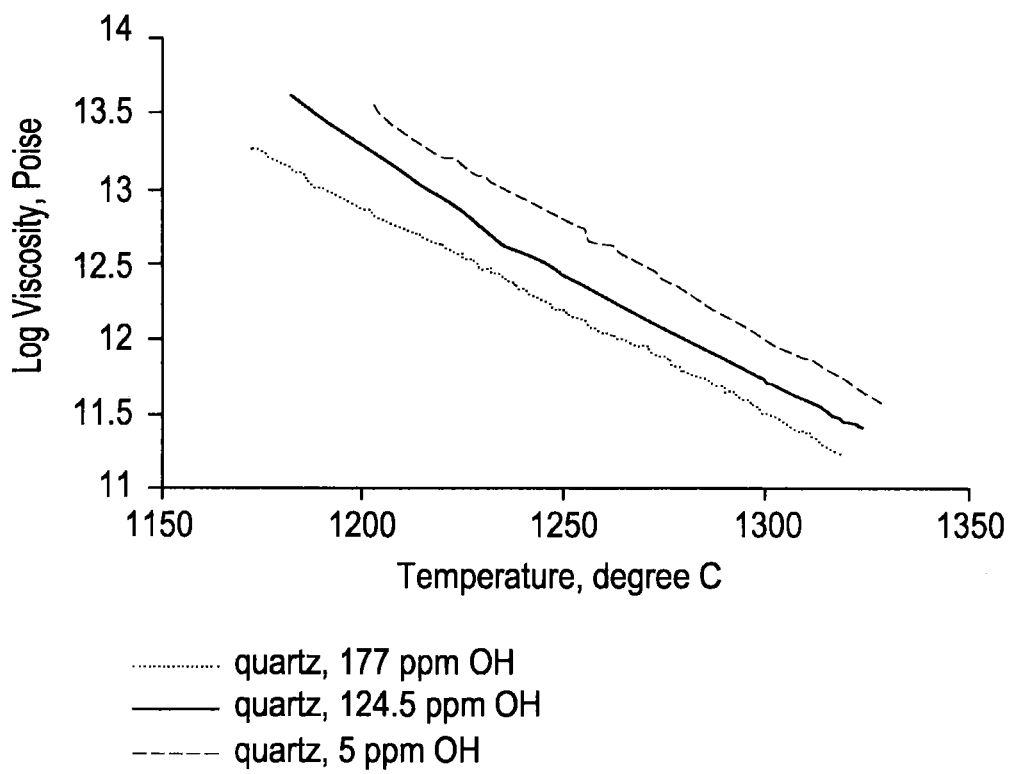
FIG. 1 is a graph illustrating the change in the viscosity of high purity quartz glass as a function of OH concentrations.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, the term "functionalized" may be used interchangeably with "surface functionalized," "functionalized surface," "coated," "surface treated," or "treated," referring to the coating of the silica and dopant components with the dispersing agent of the invention. As used herein, "coating agent" is used interchangeably with "dispersing" agent.

Although the terms may be used to denote compositions or articles of different materials (different silica concentrations), as used herein, the term "glass" may be used interchangeably with "quartz glass" or "quartz" or "fused quartz," referring to a composition, a part, a product, or an article formed by melting a mixture comprising natural or synthetic sand (silica). It is well known that the viscosity of a glass will decrease as its temperature increases. Thus, as used herein, the terms "working point temperature" and "working temperature" are both used to mean the temperature at which the glass reaches a viscosity of $10^4$ poise or below, and the softening point describes the temperature where the viscosity reaches $10^{7.6}$ poise. Either or both natural or synthetic sand (silica) can be used in the composition of the invention, and the term silica is used to denote compositions comprising either naturally occurring crystalline silica such as sand/rock, synthetically derived silicon dioxide (silica), or a mixture of both. The term "sand" may be used interchangeably with silica, denoting either natural sand or synthetic sand, or a mixture of both.

As used herein, the term "lot" when applied to a batch process for making the glass products of the invention, refers to glass articles made from a single batch of sand feed of at least 100 kg in total composition of sand and other additives. When applied to a continuous process of making glass products, the term lot refers to the glass articles having a total weight of at least 100 kg, as continuously produced from a process.

In one embodiment, the invention provides a glass composition with minimum variations in the properties of articles formed from the same batchlot of the composition, e.g., fiberglass, tubings, rods, blanks, plates, etc., via the use of at least a dispersing/coating agent that helps the dopant(s) adhere to the sand grains. The dispersant maximizes the composition homogeneity within the same batchlot, such that the articles or parts manufactured from the same batchlot have minimum variations in properties such as viscosity, OH—, and the like. The articles made from the composition of the invention with minimum variations in properties can be subsequently melted, drawn, formed or tailored into a final glass product.

Sand Component: The silica ($SiO_2$) used in the glass compositions of the present embodiments can be synthetic sand, natural sand, or a mixture thereof. In one embodiment, the amount of $SiO_2$ in the glass composition ranges from about 82 to about 99.9999%. In another embodiment, the amount of $SiO_2$ in the glass composition ranges from about 92 to about 99.9999%; from about 96 to about 99.9999 wt. %; from about 97 to about 99.9999 wt. %; even from about 98 to about 99 wt. %. In another embodiment, the glass comprises a light-transmissive, vitreous composition with an $SiO_2$ content of at least about 90 wt. %. In still another embodiment of a quartz composition with a high melting point, at least 95 wt. % $SiO_2$ is used. In yet another embodiment, the glass composition has a $SiO_2$ concentration of at least about 97 wt. %; at least about 98 wt. %; even at least about 99 wt. %. Here as elsewhere in the specification and claims, ranges can be combined to form new and non-disclosed ranges.

Dispersing Agent Component. In one embodiment, the agent is a fumed metal oxide selected from alumina, silica, titania, ceria, neodymium oxide, and mixtures thereof, having a BET value of 50 $m^2/g$ to 1000 $m^2/g$ and a particle size of less than 25 microns. Fumed metal oxides are produced using processes known in the art, in one example, the hydrolysis of suitable feed stock vapor (such as silicon tetrachloride for fumed silica) in a flame of hydrogen and oxygen.

The surface area of the metal oxides may be measured by the nitrogen adsorption method of S. Brunauer, P. H. Emmet, and I. Teller, J. Am. Chemical Society, Volume 60, Page 309 (1938) and is commonly referred to as BET. In one embodiment, the dispersing agent has a BET of 100 $m^2/g$ to about 400 $m^2/g$. In another embodiment, the fumed metal oxide dispersing agent has a mean particle size of 15 μm or less. In another embodiment, the fumed metal oxide has a mean particle size of less than 1.0 μm. In another embodiment, the fumed metal oxide has a mean particle size of 0.1-0.5 μm with a BET value of 50 $m^2/g$ to 100 $m^2/g$.

The dispersing agent is added to the glass composition in an amount ranging from 0.02 to 0.50 wt. % (based on the total weight of the final glass composition). In one embodiment, dispersant is added to the sand mixture in an amount ranging from 0.04 to 0.30 wt. %. In another embodiment, from 0.05 to 0.15 wt. %. In still another embodiment, from 0.05 to 0.10 wt. %.

In one embodiment, it is added directly to the glass composition along with the dopants. In another embodiment, it is pre-mixed with at least one of the dopant(s) or a portion of the dopant(s), forming a master batch, which is subsequently added to the sand mixture. In another embodiment, the dispersant is mixed with part or all of the selected dopant(s) forming a master batch, which master batch is subsequently added to the sand mixture and other dopants. In another embodiment, the dispersant is mixed with all or some of selected dopants as well as some of the sand to form a master batch, which master batch is subsequently added to the final sand mixture. In yet another embodiment, the dispersant is mixed with all of selected dopants as well as sand forming a master batch, which master batch is subsequently added to the sand mixture.

In one embodiment, the dispersing agent is untreated fumed silica. In another embodiment wherein $Al_2O_3$ is used as a dopant, the dispersing agent is fumed alumina. In another embodiment wherein $CeO_2$ is added as a dopant, fumed ceria is used as a dispersing agent. In another embodiment wherein one of the dopants used is $Nd_2O_3$, a mixture of fumed neodymium oxide and fumed silica is used as the dispersing agent. In yet another embodiment and regardless of the dopant(s) used, the dispersant is selected from fumed metal oxides with little adverse impact to the properties of the glass products, i.e., the group consisting of fumed alumina, silica, titania, ceria, neodymium oxide, and mixtures thereof.

Dopant Component(s): Depending on the desired properties in the final product, a number of different dopants and mixtures thereof may be added to the silica. Dopants are selected such that they reduce the working point temperature of the glass and its viscosity at a particular temperature and also such that the final glass product will exhibit low extractables and/or leaching of ions into drugs, aqueous drug formulations, or other compositions that come into contact therewith. Particularly suitable dopants are those that exhibit low solubility in the various (aqueous-based) contemplated drug compositions. Examples of suitable dopants include $Al_2O_3$, $G_eO_2$, $Ga_2O_3$, $CeO_2$, $ZrO_2$, $TiO_2$, $Y_2O_3$, $La_2O_3$, $Nd_2O_3$, other rare earth oxides, and mixtures of two or more thereof. In one embodiment, the dopant is neodymium oxide $Nd_2O_3$. In another embodiment, the dopant is aluminum oxide by itself, e.g., $Al_2O_3$, or a mixture of aluminum oxide and other dopants. In another embodiment, the dopant is $CeO_2$. In yet another embodiment, titanium oxide ($TiO_2$) may be added. In another embodiment, the dopant comprises europium oxide, $Eu_2O_3$, by itself, or in combination with other dopants such as $TiO_2$ and $CeO_2$. In still another embodiment, the dopant is yttrium oxide. Of course, as previously described, the glass composition may comprise a single dopant or any suitable combination of two or more different dopants.

In one embodiment, the dopant is present in an amount of from about 0.0001 to about 8% by weight of the total composition. In another embodiment, the dopant(s) may be present in an amount of from about 0.01 to about 8 wt. %, and in still another embodiment from about 0.1 to about 8 wt. %. In another embodiment, the dopant is present in an amount of from about 0.5 to about 5% by weight of the glass composition. It will be appreciated that some dopants may be added in an amount as low as about 0.01 wt. %, and may be, for example, in a range of from about 0.01 to about 0.1 wt. % including, for example, from about 0.01 to about 0.05 wt. %. In one embodiment, the dopants are to be added in an amount to reduce the working point temperature of the resultant quartz composition to less than 1,650° C. In another embodiment, the total amount of dopants is in the range of about 0.01 to about 8 wt. %. In still another embodiment, the total amount of dopant ranges from about 0.1 to about 8 wt. %.

The glass compositions, in one embodiment, contain a low concentration of metal impurities. The impurities may comprise metals other than the dopant metals. In one embodiment, the metal impurities include metals other than Al, Ge, Ga, Ce, Zr, Ti, Y, La, Nd, or other rare earth metals. In one embodiment, the total concentration of metal impurities is less than 1.0 wt. % or less. In another embodiment, the total concentration of metal impurities is less than 0.5 wt. % or less. In still another embodiment, the total concentration of metal impurities is less than 0.015 wt. % or less. In one embodiment, the metal impurities include alkali metals. In one embodiment, the total alkali metal concentration is less than 1.0 wt. % or less. In another embodiment, the total alkali metal concentration is less than 0.5 wt. % or less. In still another embodiment, the total alkali metal concentration is less than 0.015 wt. % or less. In one embodiment, the glass composition comprises about 3 wt. % or less of $B_2O_3$; about 2 wt. % or less of $B_2O_3$; about 1 wt. % or less of $B_2O_3$; even about 0.1 wt. % or less of $B_2O_3$.

In one embodiment, the dopant is $CeO_2$ in an amount of 0.1-5% by weight. Cerium is the only rare-earth element that absorbs UV radiation while exhibiting no absorption in the visible region of the spectrum. In another embodiment, titanium or titanium oxide may be added, wherein the addition of titanium sometimes produces yellowish-brown glass. In another embodiment, the dopant comprises europium oxide $Eu_2O_3$ by itself, or in combination with other dopants such as $TiO_2$ and $CeO_2$. In a further embodiment, dopants such as CaO and/or magnesium oxide MgO may be added to give stability to the composition.

In one embodiment of a glass composition containing 95-99.9 wt. % $SiO_2$ and excluding the dispersing agent(s), dopants are added in an amount for a composition of 95-99.9 wt. % $SiO_2$, ranging from 0.1 to 5 wt. % $Al_2O_3$, and other impurities in an amount not exceeding 150 ppm (total). In another embodiment, the composition comprises 95-99.9 wt. % $SiO_2$, 0.1 to 5 wt. % $Al_2O_3$ as a dopant, 0.1 to 400 ppm titanium (element), 0.1 to 4000 ppm Cerium (in elemental form or $CeO_2$), and other impurities not exceeding 150 ppm (total). In still another embodiment, the composition comprises 95 to 99.9 wt. % $SiO_2$, 0.1 to 5 wt. % $Al_2O_3$ as a dopant, 0.1 to 400 ppm Titanium (element), 0.1 to 4000 ppm Cerium (in elemental form or $CeO_2$), 0.01 to 2 wt. % $Nd_2O_3$, and other impurities not exceeding 150 ppm (total).

In one embodiment for a glass composition for the absorption of red light in the range of 560-620 nm, and excluding the amount of dispersant added, added dispersant, the composition comprises 95-110 parts by weight $SiO_2$, 0.5 to 1.2 parts by weight $CeO_2$, 0.5 to 2.5 parts be weight of $Nd_2O_3$, 0.1 to 1 parts by weight of $Al_2O_3$, optionally 0.001 to 0.1 parts by weight of $Eu_2O_3$, 0.001 to 0.1 parts by weight of $TiO_2$, 0.001 to 0.5 parts by weight of BaO.

Depending on the identity of the dopant and the amount of dopant present in the glass composition, the subsequent doped fused quartz glass composition exhibits a working point in the range of from about 1000 to 2,000° C. In one embodiment, the glass composition exhibits a working point of from about 1400 to about 1,900° C. In another embodiment, the doped fused quartz glass has a working point of about 1,700° C. or less, which may be much lower than the working point of undoped quartz glass. The glass compositions may have a softening point of from about 500 to about 1,700° C. In one embodiment, the glass composition has a softening point of from about 1,000 to about 1,600° C. In another embodiment, the glass composition has a softening point of from about 1,400° C. to about 1,600° C. Due to these lower working points exhibited by these doped glasses, the rods or tubes may be subsequently shaped into various pharmaceutical packaging articles more easily (by means of for instance flame conversion) than would an undoped quartz glass.

In another embodiment, UV absorbers or blockers may be added to the glass composition to minimize the transmission of UV radiation to the contents of the pharmaceutical package, thus protecting the drug contents held within from degradation. Suitable UV absorbers include Ti, Ce, and Fe. Concentrations of 2000 ppm and less are preferably used with concentrations of Fe down to <100 ppm to reduce coloration but still effectively block UV. Other transition metals that have similar impact and may be used at low levels without impacting color too much for thin wall vessels are Cr, Mn, Mo, V, and Zn. Oxidation state should be controlled (usually to the highest oxidation state) to minimize coloration.

In an alternate embodiment, undoped silica is used to make the glass and subsequent pharmaceutical packaging articles. Although having a higher working point temperature, these articles will also have the desired low amount of extractables as the doped glass composition above.

A glass composition in accordance with the present invention can be used to form a homogenous, fused glass article. A glass article formed from a glass composition in accordance with the present invention may exhibit leaching characteristics superior to borosilicate (BSi) glasses and/or soda lime (Na—Ca) glasses. In one embodiment, a glass article in accordance with the present invention exhibits superior leaching characteristics with respect to cations or metals when the glass is subjected to HCl digestion. As used herein, "HCl digestion" means hydrothermally treating a 10.0 g sample of a glass article (that has been crushed into 5-10 nm in size) with 50 ml of 0.4 M HCl solution in a Parr teflon digestion bomb at 121° C. for 2 hours. In one embodiment, the leaching characteristics of the glass may be represented in terms of extractable metal concentration, which refers to the concentration of metal extracted from the glass article when subjected to HCl digestion. In one embodiment, a glass article formed from a glass composition has a total extractable metal concentration of about 8 mg/L or less when subjected to HCl digestion, the total extractable metal concentration being represented by the total concentration of Al, B, Na, Ca, K, Li, Ba, and Mg extracted upon HCl digestion. In another embodiment, a glass article formed from a glass composition has a total extractable metal concentration of about 5 mg/L or less when subjected to HCl digestion, the total extractable metal concentration being represented by the total concentration of Al, B, Na, Ca, K, Li, Ba, and Mg extracted upon HCl digestion. In still another embodiment, a glass article formed from a glass composition has a total extractable metal concentration of about 1 mg/L or less when subjected to HCl digestion, the total extractable metal concentration being represented by the total concentration of Al, B, Na, Ca, K, Li, Ba, and Mg extracted upon HCl digestion.

In one embodiment, the total extractable metal concentration is from about 0.01 to about 8 mg/L; from about 0.05 to about 5 mg/L; even from about 0.1 to about 1 mg/L. Here as elsewhere in the specification and claims, numerical values can be combined to form new or undisclosed ranges.

In one embodiment, a fused glass article formed from the glass composition exhibits the following leaching characteristics when subjected to HCl digestion: Na (<0.1 mg/L), Ca (<0.05 mg/L), B (<0.01 mg/L), Al (<0.05 mg/L), Mg (<0.01 mg/L), or K (<0.01 mg/L). In one embodiment, a fused glass article formed from the glass composition exhibits the following leaching characteristics when subjected to HCl digestion: Na (<0.1 mg/L), Ca (<0.05 mg/L), B (<0.01 mg/L), Al (<0.05 mg/L), Mg (<0.01 mg/L), and K (<0.01 mg/L). In one embodiment, a glass article has the following leaching characteristics when subjected to HCl digestion: Na (<7.0 mg/L), Ca (<1.0 mg/L), B (<2.5 mg/L), Al (<1.25 mg/L) Ba (<0.003 mg/L), Fe (<0.01 mg/L), K (<0.03 mg/L), Mg (<0.01 mg/L), As (<0.02 mg/L), Cd (<0.001 mg/L), Cr (<0.008 mg/L), Pb (<0.009 mg/L), and Sb (<0.01 mg/L). In another embodiment, a glass article has the following leaching characteristics: Na (<0.1 mg/L), Ca (<0.05 mg/L), B (<0.01 mg/L), Al (<0.05 mg/L), Fe (<0.05 mg/L) Mg (<0.01 mg/L), K (<0.01 mg/L), As (<0.02 mg/L), Cd (<0.001 mg/L), Cr (<0.008 mg/L), Pb (<0.009 mg/L), and Sb (<0.01 mg/L).

Process for Making Glass Compositions/Products:

Glass compositions can be formed in one embodiment, using a dispensing agent as described herein. The use of dispersants in the composition of the invention facilitates the blending of the dopants in the sand feed, and thus the homogeneity of glass products made. The composition can be made by via a batch method (one-at-a-time melting process) or a continuous melting method.

In one embodiment of a batch process, the glass products are made from batches of sand feed in the form of barrels or bags of sand, with each barrel or bag having a weight of at least 100 lbs. In another embodiment, glass products are made from batches of at least 100 kg of sand feed for each batch, with the sand being supplied in barrels of sizes of 100 kg. In yet another embodiment, the sand is supplied in batches of 300 lbs. for each bag or barrel, thus making glass articles out of single batches of at least 300 lbs. each.

In one embodiment, the dispersing agent, i.e., the fumed metal oxide(s) such as fumed silica, fumed alumina, etc., is first mixed with 20-100% of a single dopant, a few dopants, or all of the dopant(s), forming a master batch or concentrate. The fumed metal oxide dispersing agent can be the same or different metal oxide(s) as the dopant material(s). The mixing/blending may be conducted in a processing equipment known in the art, e.g., blenders, high intensity mixers, etc, for a sufficient amount of time for the dopants to be thoroughly coated with the dispersing agent. In one embodiment, a mixture of fumed silica as the dispersing agent is mixed with dopants such as $Al_2O_3$, $CeO_2$, $Nd_2O_3$, etc., in a Turbula® mixer between 1 to 5 hours forming a master batch. Though not bound by theory, it is believed that the fumed silica acts as a sand grain "coating" agent and attracts smaller particles of dopant such as aluminum oxide, thus providing a more uniform mix.

In the next step, the master batch containing the coated dopant(s) is added to the natural/synthetic sand feed and the remainder of the uncoated dopants, if any, and mixed thoroughly in an equipment such as a tumbler, a sand muller, etc.

In one embodiment of the invention, the homogenous mix is calcined or heated at a temperature between 500-1500° C. for a sufficient period of time, e.g., for 0.5-4 hrs, to dry out the sand. The mixture is subsequently fused at a sufficiently high temperature to form glass products. The temperature depends on the glass composition, and in quartz compositions (having >95% $SiO_2$), the mixture is fused at a temperature of >2000° C. and ranging to 2500° C., giving a vitreous material. In one embodiment, the mixture is continuously fed into a high temperature induction (electrical) furnace operating at temperatures in the range of 1400-2300° C., forming tubes and rods of various sizes. In another embodiment, the mixture is fed into a mold wherein flame fusion is used to melt the composition, and wherein the molten mixture is directed to a mold forming the glass particle.

In one embodiment wherein the glass product is in the form of continuous tube drawing, e.g., the tubings can be made by any process known in the art including the Danner process, the Vello process, a continuous draw process or modified processes thereof.

In one embodiment, a glass composition is formed by mixing a high purity silicon dioxide (natural or synthetic sand) with at least one dopant selected from $Al_2O_3$, $G_eO_2$, $Ga_2O_3$, $CeO_2$, $ZrO_2$, $TiO_2$, $Y_2O_3$, $La_2O_3$, $Nd_2O_3$, other appropriate rare earth oxides, and mixtures of two or more thereof. The dopant(s) may be first mixed with up to 5 wt. % $SiO_2$ fumed silica before they are mixed into the final $SiO_2$ batch prior to glass melting. The mixing/blending may be conducted in processing equipment known in the art, e.g., blenders, high intensity mixers, etc, for a sufficient amount of time for the dopants to be thoroughly mixed with the silica-rich batch. This batched composition may be dried and then fused at 1,800° C. to 2,500° C. in a high induction furnace or flame fused into a homogeneous glass. In one embodiment, the mixture is continuously fed into a high temperature induction (electrical) furnace operating at temperatures in the range of up to about 2,500° C., forming tubes and rods of various sizes. In another embodiment, the mixture is fed into a mold wherein flame fusion is used to melt the composition, and wherein the molten mixture is directed to a mold forming the glass article.

Glass Products from Composition of the Invention.

Although not bound by theory, it is believed that the dispersing agent in the form of fumed metal oxide with large surface areas functions as a mixing agent, helping the dopants stick or adhere to the sand grains, thus allowing a homogeneous mix and subsequently, glass products having very little variations in properties for products resulting from the same batch of sand. The glass products can be of an intermediate form of glass tubing, for use in manufacturing halogen lamb bulbs or water treatment lamps; solid glass rods or performs for making lamp envelopes; blanks, glass plates or sheets for automotive glazing. The glass products can be of a final bulk form such as glass fiber.

In one embodiment, the tubings have sizes ranging from 1 to 500 mm outside diameter (OD), with a thickness ranging from 1 to 20 mm depending on the size of the tubing. The length of the tubings ranges from 24 to 60" for tubings with O.D of less than 100 mm and 24 to 96" for tubings with OD of greater than 100 mm.

In another embodiment of making glass preforms or rods using processes known in the art, including a continuous draw process of at least two steps. In the first step, an elongated, consolidated preform having an aperture is drawn to a reduced diameter preform. The second step involves drawing the reduced diameter preform into a rod at a lower temperature than the first step to reduce the formation of inclusions in the glass rod during drawing. In one example, the rods have OD ranges from 0.5 mm to 50 mm. In one embodiment, the rods are made in a draw process In one embodiment of a continuous process, e.g., making glass plates for use in automotive applications, after the raw materials are admixed and melted, the melt is feed to a conventional float glass furnace and subsequently into a molding forming the final product.

Uniform Properties of Glass Products:

In one embodiment, the glass products of the invention are characterized as having uniform properties for glass articles produced from the same lot, i.e., articles or pieces produced from the same mixing batch with each batch employing a minimum size of at least 100 kg. of sand, or glass articles continuously produced from a continuous process with a total weight of at least 100 kg.

Uniform properties means little variations in the properties of the glass pieces or products from the same lot are measured. The properties range from chemical properties such as OH level to physical properties such as viscosity, softening point, annealing point, etc.; thermal properties such as coefficient of thermal expansion; mechanical properties such as compressive strength; optical properties such as transmission and color, etc. As used herein a plurality of products means at least 10 samples, randomly selected from products/pieces made from the same lot.

Melting temperature, softening temperature, strain temperature, and annealing temperature respectively vary according to the glass composition, i.e., ranging from as low as 600° C. as softening point for lead borate glass to 1650° C. for fused silica. The glass articles of the invention have different working temperatures depending on the amount of silica present in the composition. However, they are all characterized as varying little in the melting temperature, softening temperature, strain temperature, and annealing temperature for glass articles made from the same lot. In one embodiment, the glass articles made from the same lot have a standard deviation $\sigma$ of less than 10° C. in their softening point, bending point, and annealing point respectively, as measured from 10 or more randomly selected samples of glass articles produced from the same lot. In a second embodiment, the standard deviation is less than 5° C. variation in the melting, softening, bending, and annealing temperatures respectively, from measuring at least 10 randomly selected samples.

In one embodiment, glass articles made from the same lot have an average annealing temperature in the range of 1000-1250° C. (corresponding to a log viscosity of 13.18 Poise), with a standard deviation $\sigma$ of less than 10° C. In a second embodiment, the glass articles have a standard deviation $\sigma$ of less than 5° C. for articles made from the same lot.

In one embodiment, the glass articles produced from the same lot have a standard deviation $\sigma$ of 10 ppm in terms of the average OH concentration. In one embodiment, the glass articles have an average OH concentration of less than 100 ppm, with a standard deviation $\sigma$ of less than 10 ppm. In another embodiment, the glass has an average OH concentration of <50 ppm, with $\sigma$ value of less than 5 ppm for glass articles from the same batch. In yet another embodiment, glass articles from the same lot have an average OH concentration of <30 ppm, with $\sigma$ value of less than 5 ppm. In a fourth embodiment, glass articles from the same lot have an average OH concentration of <20 ppm, with $\sigma$ value of less than 3 ppm.

Glass articles made from the compositions of the invention are also characterized as having excellent dimensional control/stability, e.g., with little variations in the dimensions of the finished articles made from the same mold and out of the same lot. Generally, the dimensional accuracy (moldability) of a glass product can be accurately judged by process capability (Cpk). Here, "process capability" indicates the degree of quality that is achieved when the process is standardized, and causes for abnormality are removed, whereby the process is kept in a stable condition. In one embodiment, dimensions of glass articles are measured using a micrometer and calipers for at least three dimensions, length, thickness, and width for glass articles in the form of a plate. In a second embodiment, dimensions along the line of length, thickness (of a tubing) and diameter are measured. In one embodiment, the glass articles of the invention are characterized as having a CpK (process capability index) of >1.50 in all three quantified dimensions. In a second embodiment, the glass articles have a CpK of >1.33 for articles made from the same lot. In yet another embodiment, the glass articles are measured in terms of their outer diameter, wall thickness, and ovality (variation in the outer diameter around the circumference), and wherein the articles have a CpK of >1.33 for articles from the same lot.

In one embodiment the glass articles as produced from the same lot of the invention have an average coefficient of thermal expansion from 25° C. to 320° C. of $0.54*10^{-6}$/K to $5.5*10^{-7}$/K with a standard deviation $\sigma$ of $<0.5*10^{-7}$/K. In one embodiment, the glass articles have an average coefficient of thermal expansion from 25° C. to 320° C. of less than $7.0*10^{-7}$/K, with a standard deviation $\sigma$ of $<7*10^{-8}$/K.

In one embodiment, the glass articles made from the same lot of the present invention have a refractive index ranging from 1.40 to 1.68, with a standard deviation for glass articles made from the same lot of less than 0.001. In one embodiment, the glass articles have a refractive index ranging from 1.450 to 1.480 with a standard deviation of less than 0.0001 for glass articles made from the same lot.

In one embodiment, the glass articles of the invention comprising 95-99.995 wt. % of high purity silicon dioxide display a visible transmission of above 90% in 400-800 nm wavelength range, with a standard deviation of less than 2% for glass articles produced from the same lot. In a second embodiment, the glass articles display a visible transmission of above 90% in 400-800 nm wavelength range and a standard deviation of less than 0.5% for glass articles produced from the same lot.

Applications and Articles Employing Glass Products:

In one embodiment, the molten glass composition is molded/formed into a final product such as glass plates or containers. In another embodiment for use in lamp products, e.g., lamp envelopes of tungsten-halogen lamp systems or lamp sleeves for tungsten-halogen lamps and other high temperature lighting devices ("high intensity discharge lamps"), the molten glass composition is made into intermediate glass products such as rods or tubings prior to being formed into the final glass application as lamp envelopes or sleeves.

In one embodiment, the composition is used in applications where high contrast and enhanced visible properties of transmitted or reflected visible light can be a benefit. Such uses include, for example, opthalmic glass for eyewear, such as sunglasses, or as glass hosts for lasers. In yet another embodiment, the glass can be made into computer screens with enhanced contrast properties can lessen visual discomfort, or rear-view mirrors to reduce glare. The glass products with uniform properties of the invention can also be used in applications such as containers for medical, chemical, and pharmaceutical products such as ampoules, bottles, reagent containers, test tubes, titration cylinders and the like. In another embodiment, the product is used in applications such as automotive glazing. The glass composition can also be used in bulk glass products such as fiberglass.

In one aspect, glass compositions in accordance with the present invention are particularly suitable for forming a pharmaceutical packaging article such as, for example, pre-filled syringes, syringe barrels, ampoules, vials, and the like. A pharmaceutical package or article formed from the glass compositions should exhibit better leaching characteristics, i.e., lower leaching of metals, when an inner surface of the package or article is in contact with an aqueous pharmaceutical composition including, but not limited to, drug and medicinal formulations. In one embodiment, a pharmaceutical packaging article comprising the doped glass may be provided such that the article is substantially free of a coating layer disposed on the surface of the article in contact with a pharmaceutical composition. Articles employing a doped glass in accordance with the present invention, may be free of a coating and exhibit leaching characteristics when in contact with a pharmaceutical composition that is at least comparable to coated BSi or soda lime glasses and superior to uncoated BSi or soda lime glasses.

In one embodiment, a pharmaceutical packaging article comprising the glass composition is formed by thermal processing, such as flame fusion conversion process. The article exhibits little or no alkali oxide, alkaline earth oxide, or borate formation at or near the surface of the article during the thermal processing. In one embodiment, the concentration of alkali metals, alkaline earth metals, and/or boron is about 5 wt % or less within a distance of 5 µm of the surface of the article. In one embodiment the concentration of alkali metals, alkaline earth metals, or boron is 1 wt % or less within 5 µm of the surface of the article. In one embodiment, the concentration of alkali metals, alkaline earth metals, or boron is 100 ppm or less within 5 µm of the surface of the article. In one embodiment the concentration of alkali metals, alkaline earth metals, or boron concentration is 10 ppm or less within 5 µm of the surface of the article. The alkali, alkaline earth, or boron concentration within 5 µm of the surface of the article may be determined by any suitable method including surface etching followed by Inductively Coupled Plasma Mass Spectrometry (ICP-MS). It will be appreciated that the alkali metal or alkaline metal can be derived from any alkali metal compound or alkaline metal compound including, but not limited to, oxides or hydroxides of alkali or alkaline metals.

In one embodiment, the pharmaceutical packaging article comprising the glass composition produces 1000 particles/$cm^2$ or less when in contact with a pharmaceutical aqueous solution at pH from about 3 to 10 for 60 days. In one embodiment, the article produces 500 particles/$cm^2$ or less when in contact with a pharmaceutical aqueous solution at pH from about 3 to 10 for 60 days. In one embodiment, the article produces 100 particles/$cm^2$ or less when in contact with a pharmaceutical aqueous solution at pH from about 3 to 10 for 60 days. In one embodiment, the article produces 50 particles/$cm^2$ or less when in contact with a pharmaceutical aqueous solution at pH from about 3 to 10 for 60 days. In one embodiment, the article produces 10 particles/$cm^2$ or less when in contact with a pharmaceutical aqueous solution at pH from about 3 to 10 for 60 days. The number of particles formed from the glass article may be determined by any suitable method including a laser particle counting instrument.

Aspects of the present invention may be further understood with respect to the following examples.

EXAMPLES

In the examples, fumed silica is commercially available from Matteson-Ridolfi Inc. as Cab-O-Sil M5, with a B.E.T. surface area of 200 $m^2$/g and average particle (aggregate) size of 0.2-0.3 µm. The sand used is a natural sand having a purity level of at least 99.99%, which is commercially available from a number of sources.

Example 1

A glass composition is made with 96 wt. % high purity silicon dioxide, 4 wt. % $Al_2O_3$ as a dopant, and with other impurities kept at below 150 ppm. The $Al_2O_3$ dopant is first coated with 0.08 wt. % of fumed silica prior to being mixed into the batch of $SiO_2$. The composition is then fused in a high induction furnace at 2000° C., forming quartz tubings (labeled as LSPG 1 in subsequent examples).

Example 2

A UV-blocking glass composition is made with 96 wt. % high purity silicon dioxide, 4 wt. % $Al_2O_3$, 200 ppm of titanium, and 500 ppm of $CeO_2$, with other impurities kept at below 150 ppm. The $Al_2O_3$, titanium, $CeO_2$ dopant mixture is first coated with 0.05 wt. % of fumed silica prior to being mixed into the batch of $SiO_2$. The composition is then fused in a high induction furnace at 2000° C., forming quartz tubings (labeled as LSPG 2 in subsequent examples).

Example 3

Random samples from sections of fused quartz tubings made from the quartz glass composition LSPG1 of Example 1 were measured for OH concentration (in ppm). Random samples were also obtained from commercially available fused quartz glass tubings sold as Vycor® 7907, Vycor®

7913, and Vycor® 7921 from Corning Incorporated of Corning, N.Y. and measured for OH concentration. Standard deviations were measured and the results are as follows in Table 1:

TABLE 1

|  | Example 1 Tubing | Vycor 7907 Tubing | Vycor 7913 Tubing | Vycor 7921 Tubing |
| --- | --- | --- | --- | --- |
|  | 39.15 | 241.56 | 124.46 | 118.83 |
|  | 39.82 | 277.49 | 153.54 | 123.66 |
|  | 36.66 | 267.46 | 110.11 | 105.43 |
|  | 36.09 | 267.21 | 130.27 | 89.35 |
|  | 36.14 | 251.51 | 116.89 | 119.28 |
|  | 36.21 | 268.57 | 212.04 | 122.62 |
|  |  |  | 224.87 |  |
|  |  |  | 224.38 |  |
|  |  |  | 210.58 |  |
|  |  |  | 91.48 |  |
|  |  |  | 83.6 |  |
|  |  |  | 77.07 |  |
|  |  |  | 66.99 |  |
|  |  |  | 90.45 |  |
| Ave. OH | 37.345 | 262.300 | 136.909 | 113.195 |
| Stand. Dev. | 1.683 | 13.171 | 57.905 | 13.387 |

Example 4

Figure 2:
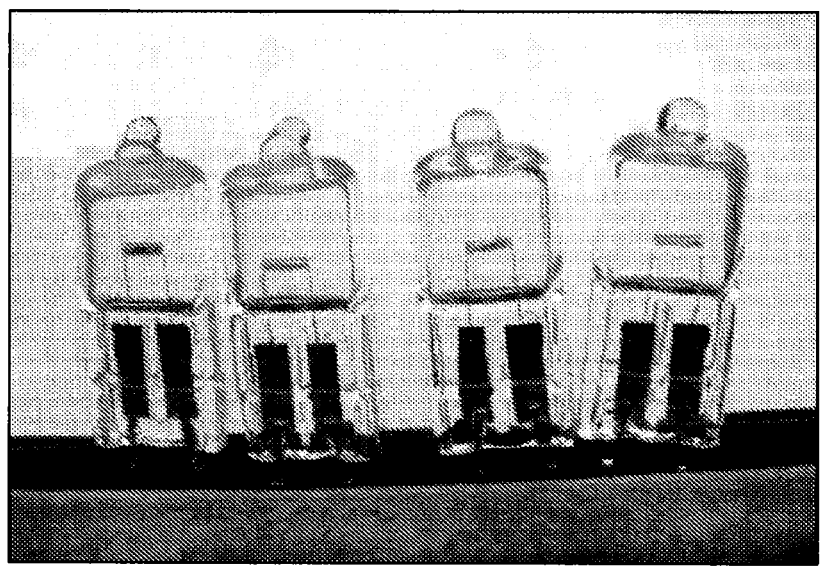
FIG. 2 is a photograph comparing lamp envelopes made from the glass products of composition in one embodiment of the invention, i.e., 2 wire lamps on the right vs. 2 lamp envelopes made from a glass product composition in the prior art (lamps on the left).

Lamp envelopes were made out of randomly selected fused quartz tubings made from the composition LSPG 1 of Example 1 and the Vycor® 7913 tubings. No adjustments were made to the lamp manufacturing line to account for the differences in the physical and chemical properties of the tubings. FIG. 2 is a photograph comparing the lamps made from the quartz composition of the invention (two lamps on the right hand side) and lamps made from the composition of the prior art (two lamps on the left side of the picture), showing deformity in the two lamps made from a composition of the prior art Example 5

Figure 3:
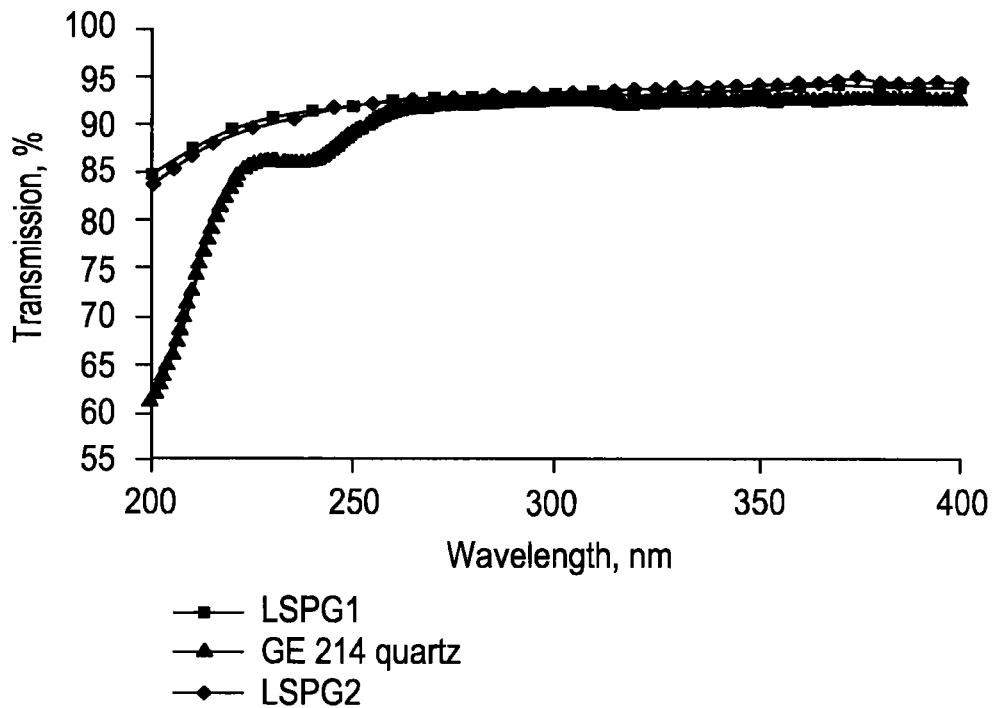
FIG. 3 is a graph comparing the variations in UV transmission data for samples from the glass products of the invention as made from the same batchlot vs. samples from glass products made from a composition in the prior art.

UV transmittance data between 200 to 400 nm were measured for samples of quartz tubings made from: a) compositions LSPG1 and LSPG2 of Examples 1-2; b) commercially available GE214 natural quartz from GE Quartz, Inc. of Ohio. FIG. 3 is a graph comparing the UV transmission data, showing that the quartz glass products of the invention as made from the same batch have a much narrower UV transmission variation band compared to a quartz glass composition of the prior art (GE214 quartz).

Also as illustrated, the quart glass products of the invention absorb at least 90% of UV radiation between 250 to 400 nm, and at least 87% of the UV radiation between 200 to 400 nm. Although not measured/illustrated in FIG. 3, it is noted that publicly available transmission data for Vycor 7913 shows a significant jump from <5% to about 90% from 200 to 300 nm for Vycor 7913, as compared to a narrow variation of less than 10% for the compositions of the invention in the range of 200 to 300 nm.

Example 6

Figure 4:
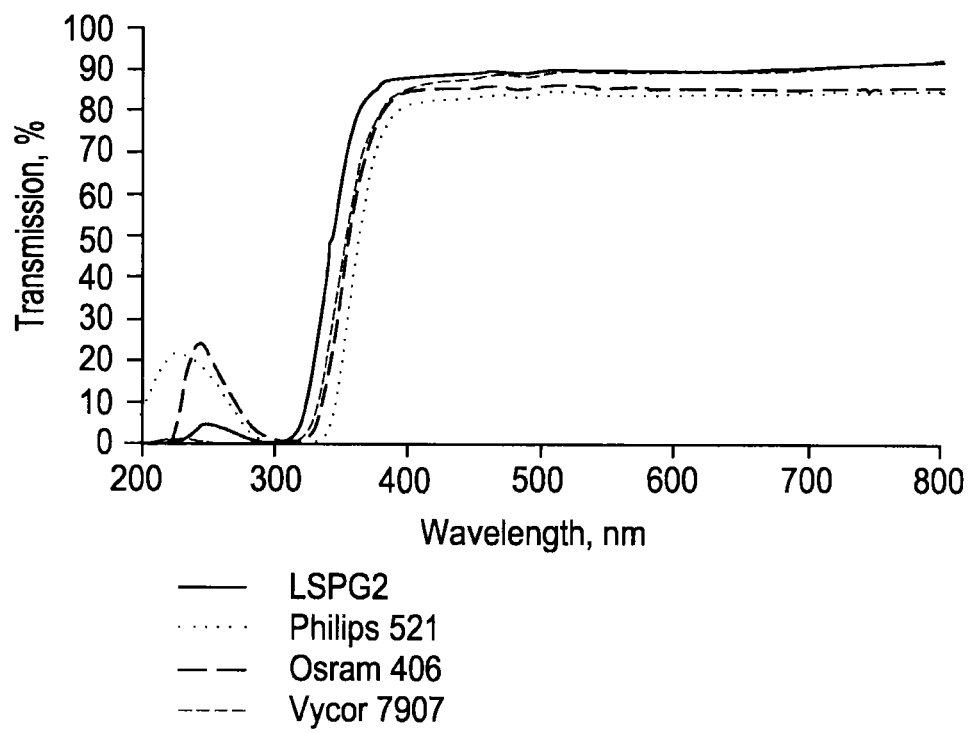
FIG. 4 is a graph comparing the variations in UV transmission data over a range of 200-800 nm, for samples from the glass products of the invention as made from the same batchlot vs. samples from commercially available glass products in the prior art.

UV transmittance data between 200 to 800 nm were measured for samples of quartz tubings made from composition LSPG2 of Example 2 and commercially available products including Osram 406, Philips 521, and Vycor 7907. FIG. 4 is a graph comparing the UV transmission data for the various samples. As noted, the transmission data for the sample of the invention shows little variation in the 200-300 nm range compared to the samples of the prior art.

Example 7

Figure 5:
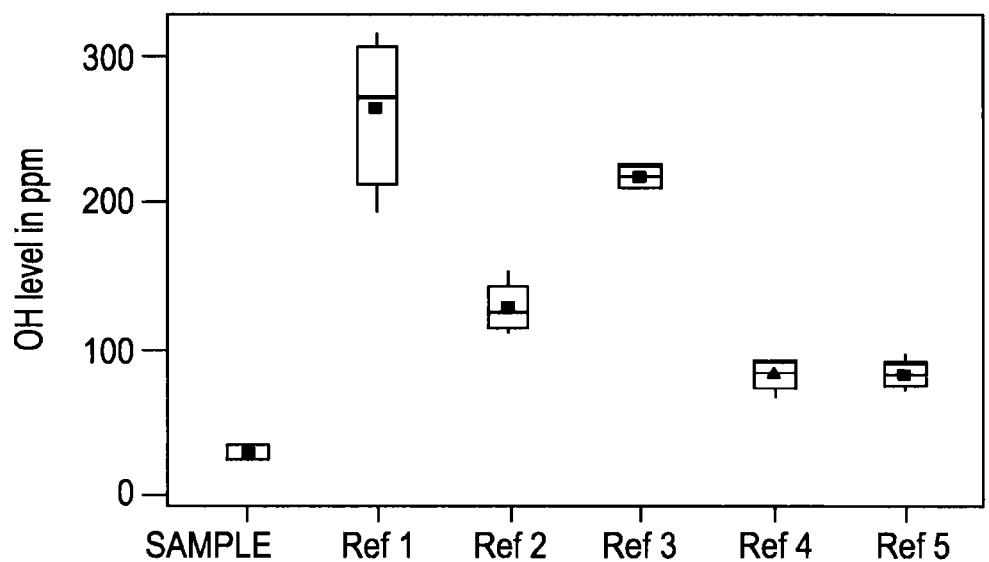
FIG. 5 is a graph comparing the average OH concentration and standard deviation of an embodiment of the glass composition of the invention vs. reference samples from commercially available glass products in the prior art.

OH concentrations were measured for samples of quartz tubings made from composition LSPG2 of Example 2 and commercially available products including Osram 406, Philips 521, Vycor 7907, and Philips low viscosity glass. FIG. 5 is a graph comparing the OH concentration in ppm for the composition Example 2 vs. the various prior art glass samples (commercially available glasses indicated as reference samples 1-5). As shown in the Figure, the sample of the invention has a much lower average OH level and standard deviation compared to the samples of the prior art.

Example 8

Figure 6:
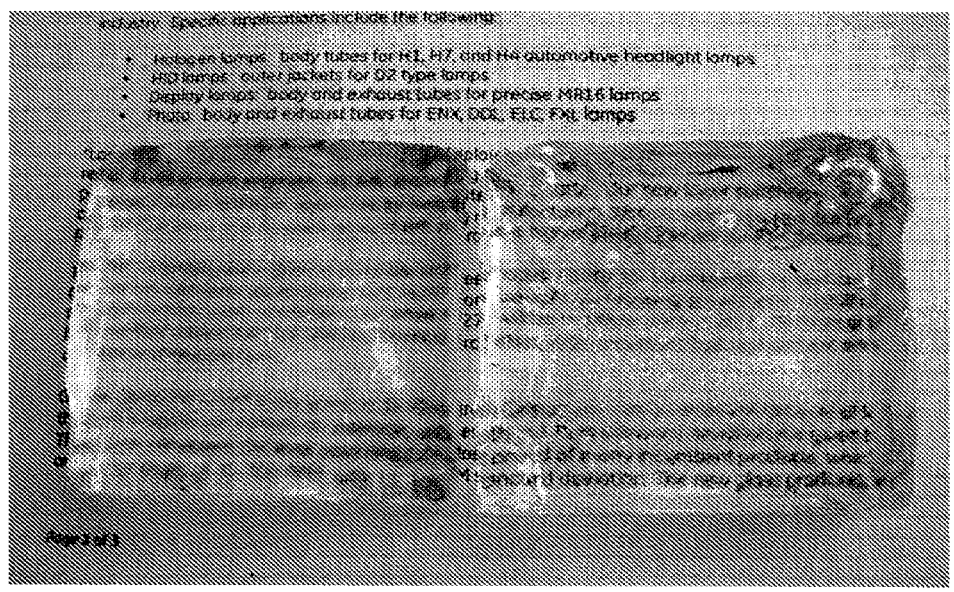
FIG. 6 is a photograph comparing a glass "puck" made from the glass products of composition in one embodiment of the invention vs. a glass puck made from a glass product composition in the prior art, particularly with respect to degree of clarity (or transmission through the glass).

Glass pucks having dimensions of 4" by 4" by 1" (in thickness) are fused from: (1) comparative glass composition containing 96 wt. % high purity silicon dioxide, 4 wt. % $Al_2O_3$ as a dopant, and with other impurities kept at below 150 ppm; and (2) a composition of the invention, LSPG1 composition of Example 1 with 0.08 wt. % of fumed silica. FIG. 6 is a photograph comparing the two glass pucks side by side, comparative glass puck on the left of the picture and the LSPG1 glass puck on the right. As shown, the glass on the right has a greater degree of clarity (or transmission through the glass) compared to the glass on the left, with the letters underneath the LSPG1 puck on the right appear to be more clear/easier to read.

Examples 9-13

Figure 7:
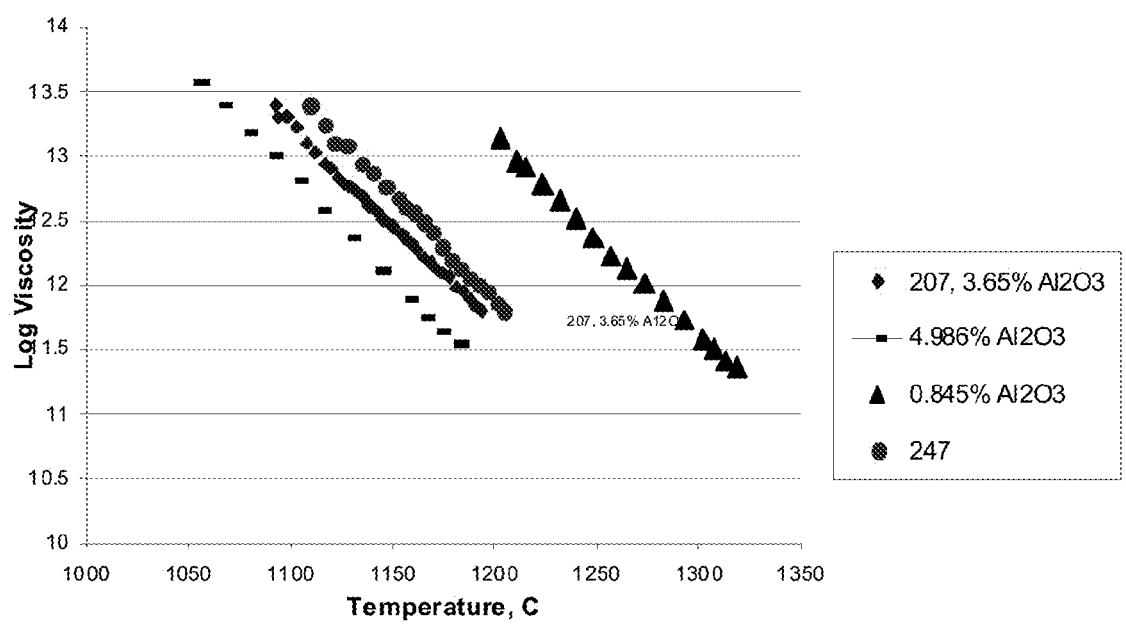
FIG. 7 illustrates the viscosity as a function of temperature of glass compositions in accordance with aspects of the present invention.

Various samples of doped fused quartz glass were produced and their respective viscosity versus temperature performance was recorded. The examples were fused according to the previously described procedure, and the viscosity (in poise) was measured as a function of temperature. The results are set forth in FIG. 7, which shows the log viscosity versus temperature. From this data, the softening temperature (temperature at which the glass has a viscosity of $10^{7.6}$ poise) of each sample was calculated. The results are set forth below in Table 2.

TABLE 2

| Ex. | Sample ID | Compositions | Softening Temperature |
| --- | --- | --- | --- |
| 9 | LSPG 3 | $SiO_2$ doped with 0.845 wt. % $Al_2O_3$ | 1558° C. |
| 10 | LSPG 4 | $SiO_2$ doped with 1.685 wt. % $Al_2O_3$ | 1535° C. |
| 11 | LSPG 5 (ID 207) | $SiO_2$ doped with 3.65 wt. % $Al_2O_3$ | 1470° C. |
| 12 | LSPG 6 | $SiO_2$ doped with 4.986 wt. % $Al_2O_3$ | 1419° C. |
| 13 | LSPG 7 (ID 247 on chart) | $SiO_2$ doped with 3.2 wt. % $Al_2O_3$, 0.18 wt. % $CeO_2$, 0.03 wt. % $TiO_2$ | 1454° C. |

As can be seen, all of these samples exhibited a softening temperature that was dependent upon the dopant content, and many are lower than that of pure fused quartz glass which can range from 1500-1680° C. Therefore, it can be seen that increasing the dopant content in the glass (in these examples aluminum oxide) resulted in a reduction in the temperature required to achieve a particular viscosity. Furthermore, increasing the aluminum oxide content in the glass results in reduced viscosity at a particular temperature.

Extraction Testing:

The composition of Example 13 (LSPG7) was then selected for extraction testing to compare the amount of extractables leached from the glass compared to the amount extracted from pure quartz glass as well as traditional pharmaceutical grade borosilicate glass and soda-lime glass containers. The containers had the following compositions and dimensions:

214A: Momentive 214 A tube ID 10×OD13-80 mm, pure fused quartz glass (available from Momentive Performance Materials Quartz Inc.) LSPG7: LAHF D70000496 IV, 11.7× 14.1×200 mm, BULKAG03 ($SiO_2$ glass doped with 3.2 wt. % $Al_2O_3$, 0.18 wt. % $CeO_2$, 0.03 wt. % $TiO_2$)

BSi Schott: Type 1 glass, pharmaceutical grade borosilicate glass vial: (Outer Diameter 24 mm and height: 45 mm). Typical chemical composition by wt %: $SiO_2$ (75%), $B_2O_3$ (10.5%). $Al_2O_3$ (5%), CaO (1.5%), BaO (<1%), $Na_2O$ (7%) (from Schott).

BSi SD: Neutral Borosilicate Glass: Vials (Inner Diameter 22 mm and Outer Diameter 24 mm). Typical chemical composition by wt %: $SiO_2$ (76%), $Al_2O_3$ (2.5%), RO (0.5%), $R_2O$ (8%) and $B_2O_3$ (12%). (From Shangdong Pharmaceutical Glass Co. Ltd.)

Na—Ca SD: Soda lime silicate glass: Vials (10 ml and 20 ml). Typical chemical composition by wt %: $SiO_2$ (71%), $Al_2O_3$ (3%), RO (12%) and $R_2O$ (15%) (From Shangdong Pharmaceutical Glass Co. Ltd.)

Sample Preparing and Testing:

First, the tubes or vials were crushed into 5-10 mm size pieces using a zirconia hammer. Approximately 100 g of each sample was then washed in DI water three times. After that, the crushed samples were washed with 5% HF followed by a DI water rinse. After the washed crushed samples were dried, a nylon screen mesh and zirconia mortar and pestle was used to further crush the samples into cullet with particles approximately 300 to 420 micrometers in size. Then AR grade alcohol was used to wash the cullet samples and the samples were then dried in quartz glass beaker. Then, 10.0 g of each sample was subjected to HCl digestion by hydrothermally treating a 10.0 g of a sample with 50 ml 0.4M HCl solution in a Parr teflon digestion bomb at 121° C. for 2 hours. After cooling, 40 ml of the resultant residual solution from each sample was tested for various leachants by ICP-AES testing. The results are shown in Table 3.

coated with silica to minimize the cationic extraction. Type 1 Shott borosilicate glass vials exhibit relative high cationic extraction (Na (3.5 ppm), Ca (1.1 ppm), B (3.5 ppm) and Al (2.3 ppm)). Due to the pure silica coating, Type 1 plus pharmaceutical containers exhibit extremely low cationic extraction (below the detection limit of the equipment used: Na (<0.01 ppm), Ca (<0.05 ppm), B (<0.1 ppm) and Al (<0.05 ppm)). The current invention, however, provides an alternative to coated borosilicate glasses (Type 1 plus) glasses, in that it provides monolithic, homogeneous, high purity fused quartz glass and lower softening point, high silica glasses based upon doping with non-traditional modifiers that minimize cationic extraction when said containers come into contact with an aqueous drug formulation. This reduces the manufacturing complexity and high cost of the CVD-based silica coating used to manufacture Type 1 plus containers. Type 1 plus containers must first be formed by thermal processing, such as flame conversion, of a tube of borosilicate glass into a pharmaceutical container (eg, vial, syringe, cartridge, etc). That container is then CVD coated with a layer of silica to mask the inherently poor chemical durability of the underlying borosilicate glass and/or even lower durability regions that were formed during thermal processing (eg., from the volatilization and redeposition of alkali oxide, alkaline earth oxide, and/or borate rich phases during thermal processing). Therefore Type 1 plus containers are both encumbered by multi-step processing (thermal processing and then CVD coating) and they are not a monolithic/homogeneous glass solution, rather they are comprised of a masking layer that may have inherent long term durability problems when used for the long term storage of drugs (especially liquid based drugs) in a pharmaceutical package (such as a vial, syringe, cartridge, etc).

Results:

The fused quartz glass sample (214A in above table) exhibited As, Cd, Cr, Pb and Sb leaching that was below detectable limits. Likewise, the As, Cd, Cr, Pb and Sb leached by the LSPG5 sample ($SiO_2$ glass doped with 3.2 wt. % $Al_2O_3$, 0.18 wt. % $CeO_2$, 0.03 wt. % $TiO_2$ as prepared above) were all below detectable limits. In contrast, the BSi SD and BSi Schott glasses, which are commonly used within the pharmaceutical packaging industry, exhibited approximately 0.2 mg/L of As (a toxic element that could potentially poison a pharmaceutical formulation).

TABLE 3

Element Leached Content In Residual Leaching Solution

| Element mg/L (ppm) | 214 A Mean | 214 A STDEV | LSPG7 Mean | LSPG7 STDEV | BSi Schott Mean | BSi Schott STDEV | BSi SD Mean | BSi SD STDEV | Na—Ca SD Mean | Na—Ca SD STDEV |
|---|---|---|---|---|---|---|---|---|---|---|
| Na | 0.018 | 0.001 | 0.057 | 0.002 | 7.883 | 0.001 | 8.740 | 0.473 | 42.341 | 7.948 |
| Ca | 0.029 | 0.009 | 0.032 | 0.005 | 1.002 | 0.104 | 0.956 | 0.067 | 2.647 | 0.030 |
| B | <0.01 | | <0.01 | | 2.710 | 0.319 | 3.322 | 0.167 | 0.102 | 0.011 |
| Al | 0.022 | 0.007 | 0.021 | 0.029 | 1.419 | 0.023 | 1.596 | 0.124 | 0.452 | 0.102 |
| Ba | <0.001 | | <0.001 | | 0.003 | 0.000 | 0.028 | 0.002 | 0.003 | 0.002 |
| Fe | 0.022 | 0.001 | 0.027 | 0.001 | 0.016 | 0.001 | 0.013 | 0.002 | 0.018 | 0.004 |
| K | 0.007 | 0.001 | 0.008 | 0.001 | 0.036 | 0.003 | 0.036 | 0.002 | 0.128 | 0.019 |
| Mg | 0.004 | 0.001 | 0.005 | 0.001 | 0.013 | 0.001 | 0.006 | 0.001 | 0.777 | 0.166 |
| As | <0.02 | | <0.02 | | 0.021 | 0.002 | 0.029 | 0.000 | 0.122 | 0.022 |
| Cd | <0.001 | | <0.001 | | <0.001 | | <0.001 | | <0.001 | |
| Cr | <0.008 | | <0.008 | | <0.008 | | <0.008 | | <0.008 | |
| Pb | <0.009 | | <0.009 | | <0.009 | | <0.009 | | <0.009 | |
| Sb | <0.01 | | <0.01 | | <0.01 | | <0.01 | | <0.01 | |

U.S. Pat. No. 6,537,626 indicated cationic extraction data for Type 1 is Schott borosilicate glass vials and Type 1 plus is comprised of vials where the interior surface had been The 214A and LSPG7 samples both exhibited B leaching that was below the detection limit, and at least 270 times less than that leached from the BSi Schott or the BSi SD borosilicate glasses. Finally, the LSPG7 and 214A samples were very resistant to Na, Ca, Al, K, and Mg leaching, while the BSi Schott, BSi SD and Na—Ca SD glasses exhibited much higher leaching of these elements as shown in the Table 3.

According to standard testing methods, LSPG7 also exhibits excellent properties with respect to Hydrolytic resistance (ISO 719)/YBB00362004 at 98° C. and YBB00252003 at 121° C. (Results: 0.00 mL hydrochloric solution/g cullet); Acid resistance (DIN 12116)/YBB00342004 (Results: 0.2 mg/dm$^2$); Alkali resistance (ISO 695)/YBB00352004 (Results: 49 mg/dm$^2$).

The 214A and LSPG glasses exhibit exceptionally low cationic leaching, which is expected to be similar to that from a SiO$_2$ coated glass container (e.g., a Type 1 plus Schott container). However, from production cost and quality control perspectives, containers produced from the glass described herein (a monolithic, homogeneous modified silica glass tubing with low working point temperature) would have an advantage compared with Type I plus technology in that the containers would be made from homogeneous low extractable glass having an appropriate working point temperature to enable direct flame conversion processing of tubing into pharmaceutical packages without the need for coating. In contrast, Type I plus containers have a silica coating that is used to "mask" the cation leaching from the homogeneous, base borosilicate glass that was used to fabricate the pharmaceutical package. The coating process is expensive and cumbersome (requiring a separate manufacturing line/process that is used to apply the silica coating to the interior of the container after thermal conversion process), and may not be applicable to all complex shapes/formats, especially some of the complex formats required for prefilled injectables, pens and/or other complex drug delivery packages. Furthermore, the thermal process to convert the BSi glass to a container may cause volatilization of alkali oxide, alkaline earth oxide, and/or borate in the glass composition followed by their re-deposition on surface of the container. Hence, the surface of the containers may already be heterogeneous before coating, which can result in loss of durability and integrity of the Type 1 plus article.

The foregoing description identifies various, non-limiting embodiments of glass compositions and articles made therefrom in accordance with aspects of the present invention. Modifications may occur to those skilled in the art and to those who may make and use the invention. The disclosed embodiments are merely for illustrative purposes and not intended to limit the scope of the invention or the subject matter set forth in the following claims.

The invention claimed is:

1. A silica glass composition comprising about 92 to about 99.9 wt. % SiO$_2$ and about 0.1 to about 8 wt. % of a dopant selected from Al$_2$O$_3$, GeO$_2$, Ga$_2$O$_3$, CeO$_2$, ZrO$_2$, Y$_2$O$_3$, a rare earth oxide, or mixtures of two or more thereof, wherein the composition contains less than 1 wt. % of metal impurities chosen from alkali metals and/or alkaline earth metals, and less than 3 wt. % of borate ions; and further comprising a UV blocker comprising Ti, Ce, Fe, or combinations of two or more thereof, the UV blocker being present in amount of from about 0.001 to about 0.5 wt %.

2. The glass composition of claim 1, wherein a fused glass article formed from the composition has a total extractable metal concentration of about 8 mg/L or less when subjected to HCl digestion, the total extractable metal concentration being represented by the total concentration of Al, B, Na, Ca, K, Li, Ba, and Mg extracted upon HCl digestion.

3. The glass composition of claim 1 comprising about 96 to about 99.9 wt % SiO$_2$.

4. The glass composition of claim 2, wherein the total extractable metal concentration is about 5 mg/L or less.

5. The glass composition of claim 2, wherein the total extractable metal concentration is about 1 mg/L or less.

6. The glass composition of claim 1, wherein the glass composition exhibits a working point temperature in the range of from about 1,000 to about 2,000° C.

7. The glass composition of claim 1, wherein the glass composition exhibits a softening point temperature in the range of about 500 to about 1,700° C.

8. The glass composition of claim 1, wherein a fused glass article formed from the glass composition exhibits the following leaching characteristics when subjected to HCl digestion: Na (<7.0 mg/L), Ca (<1.0 mg/L), B (<2.5 mg/L), Al (<1.25 mg/L), K (<0.03 mg/L), or Mg (<0.01 mg/L).

9. The glass composition of claim 1, wherein a fused glass article formed from the glass composition exhibits the following leaching characteristics when subjected to HCl digestion: Na (<7.0 mg/L), Ca (<1.0 mg/L), B (<2.5 mg/L), Al (<1.25 mg/L), K (<0.03 mg/L), and Mg (<0.01 mg/L).

10. The glass composition of claim 1, wherein a fused glass article formed from the glass composition exhibits the following leaching characteristics when subjected to HCl digestion: Na (<0.1 mg/L), Ca (<0.05 mg/L), B (<0.01 mg/L), Al (<0.05 mg/L), Mg (<0.01 mg/L), or K (<0.01 mg/L).

11. The glass composition of claim 1, wherein a fused glass article formed from the glass composition exhibits the following leaching characteristics when subjected to HCl digestion: Na (<0.1 mg/L), Ca (<0.05 mg/L), B (<0.01 mg/L), Al (<0.05 mg/L), Mg (<0.01 mg/L), and K (<0.01 mg/L).

12. The glass composition of claim 1, wherein the total concentration of metal impurities is about 0.5 wt. % or less.

13. The glass composition of claim 1, wherein the total concentration of metal impurities is about 0.015 wt. % or less.

14. The glass composition of claim 1, wherein a fused glass article formed from the glass composition has an OH concentration of 0.5% or less, a Cl concentration of 0.5% or less, or an OH concentration and Cl concentration of 0.5% or less.

15. The glass composition of claim 1, wherein a fused glass article formed from the glass composition has an OH concentration of 150 ppm or less, a Cl concentration 150 ppm or less, or an OH concentration and Cl concentration of 150 ppm or less.

16. The glass composition of claim 1, wherein a fused glass article formed from the glass composition has an OH concentration of 50 ppm or less, a Cl concentration of 50 ppm or less, or an OH concentration and Cl concentration of 50 ppm or less.

17. The glass composition of claim 1, wherein a fused glass article formed from the glass composition has an OH concentration of 10 ppm or less, a Cl concentration of 10 ppm or less, or an OH concentration and Cl concentration of 10 ppm or less.

18. The glass composition of claim 1, wherein the glass composition exhibits a coefficient of thermal expansion of less than 3 ppm/K.

19. The glass composition of claim 1, wherein the glass composition exhibits a coefficient of thermal expansion less than 2 ppm/K.

20. The glass composition of claim 1, wherein the glass composition exhibits a coefficient of thermal expansion of less than 1 ppm/K.

21. The glass composition of claim 1, having a working point temperature of about 1,700° C. or less.

22. A glass article comprising a silica glass composition comprising about 92 to about 99.9 wt. % $SiO_2$ and about 0.1 to about 8 wt. % of a dopant selected from $Al_2O_3$, $GeO_2$, $Ga_2O_3$, $CeO_2$, $ZrO_2$, $Y_2O_3$, a rare earth oxide, or mixtures of two or more thereof, wherein the silica glass composition contains less than 1 wt. % of metal impurities chosen from alkali metals and/or alkaline earth metals, and less than 3 wt. % of borate ions, the article having a total extractable metal concentration of about 8 mg/L or less when subjected to HCl digestion, the total extractable metal concentration being represented by the total concentration of Al, B, Na, Ca, K, Li, Ba, and Mg extracted upon HCl digestion; wherein the glass article is formed by a continuous draw process.

23. A silica glass composition comprising at least 99.9% wt. % $SiO_2$ and a dopant selected from $GeO_2$, $TiO_2$, or mixtures thereof in an amount of about 0.1 to about 0.0001 wt. %, wherein the composition contains less than 1 wt. % of metal impurities chosen from alkali metals and/or alkaline earth metals, and less than 3 wt. % of borate ions.

24. The glass composition of claim 23 comprising greater than about 99.95 wt. % $SiO_2$.

* * * * *